Figure 1:
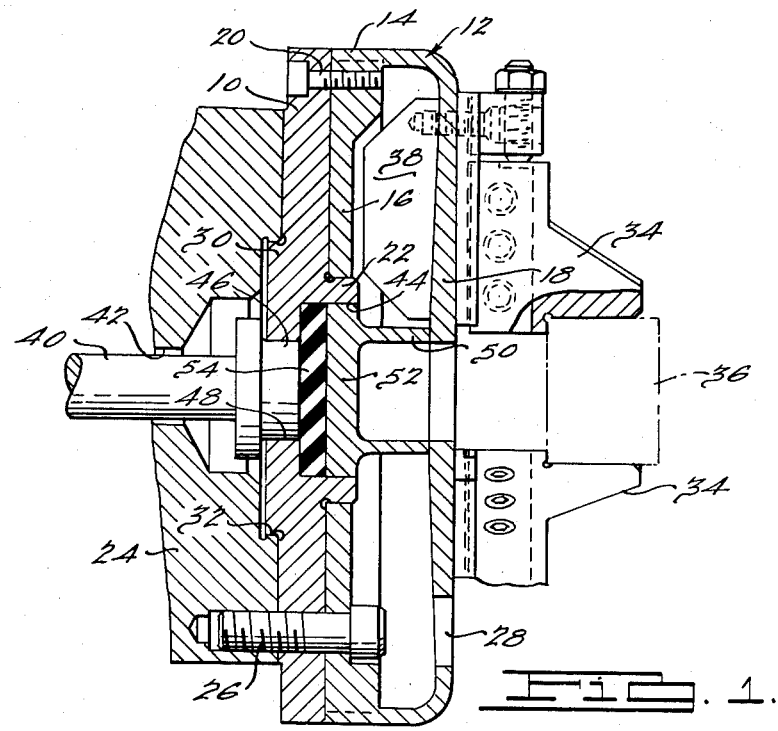

May 29, 1956  G. HOHWART ET AL  2,747,880
RUBBER POWER BOOSTER

Filed Feb. 23, 1952  2 Sheets-Sheet 1

INVENTORS.
George Hohwart,
Ernest F. Hohwart.
BY
Harness, Dickey & Pierce
ATTORNEYS.

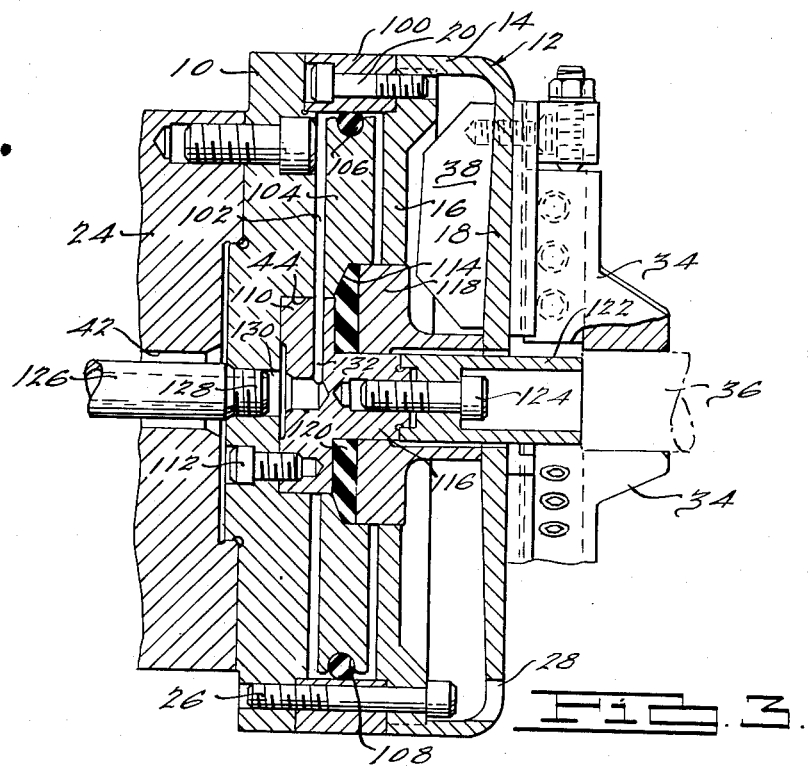
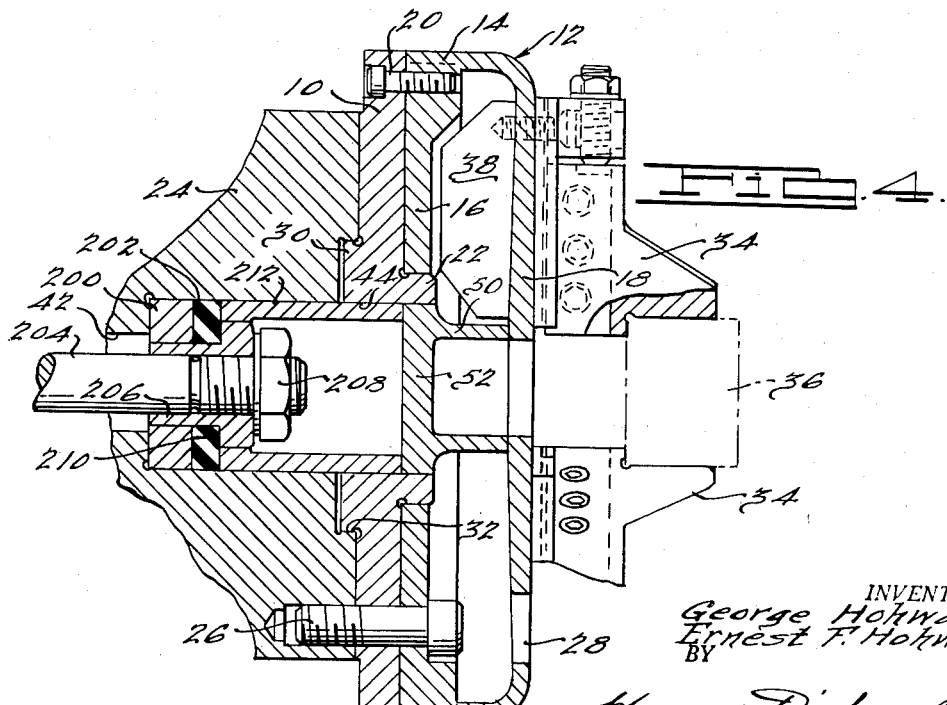

United States Patent Office 2,747,880
Patented May 29, 1956

2,747,880
RUBBER POWER BOOSTER

George Hohwart, Farmington Township, Oakland County, and Ernest Frederick Hohwart, Detroit, Mich., assignors to N. A. Woodworth Company, Ferndale, Mich., a corporation of Michigan Application February 23, 1952, Serial No. 273,106

10 Claims. (Cl. 279—4)

This invention relates broadly to new and useful improvements in power boosters and more particularly to a power booster which is primarily adapted and pre-eminently suited for use with diaphragm chucks.

The instant invention was developed primarily for use with diaphragm chucks of the type disclosed in applicants' Patent No. 2,450,800, issued October 5, 1948, but it will be readily appreciated that it can be used with many specifically different mechanisms. The power booster can be used in any capacity where it is desired to transmit force from a driving element to a driven element and particularly where it is desired to multiply the driving force as it is transmitted from one element to the other or wherever it is desirable to multiply the linear travel of the driving element so as to produce a relatively greater movement of the driven element. It is contemplated that the power booster of this invention be used in any capacity where it has utility. For purpose of illustration, however, the booster is here shown incorporated in a diaphragm chuck of the type invented by the instant applicants and it is herein described in this particular setting.

In the drawings forming a part of this specification and wherein like numerals are employed to designate like parts throughout the same.

Figure 2:
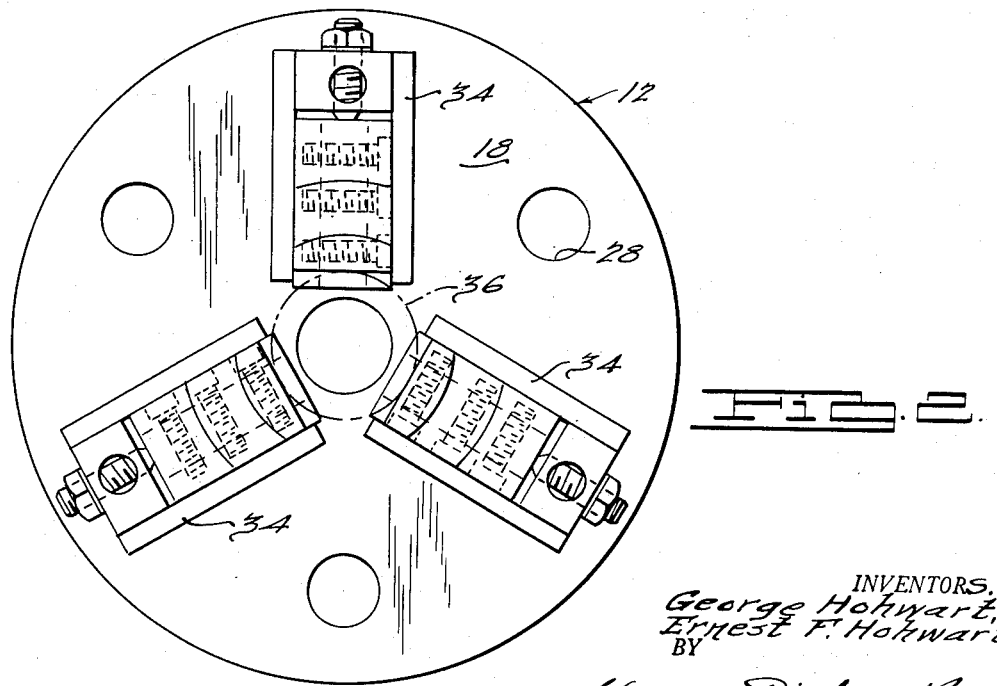

Fig. 1 is a longitudinal sectional view through a diaphragm chuck and illustrating the power booster of this invention incorporated in the body of the chuck, Fig. 2 is a front view of the chuck, Fig. 3 is a longitudinal sectional view showing a modified chuck construction having a power booster embodying the instant invention incorporated therein, and Fig. 4 is a longitudinal sectional view showing still another modified chuck construction and having incorporated therewith a power booster embodying the instant invention.

Attention is first directed to the form of the invention shown in Figs. 1 and 2 which illustrate a chuck having a generally disk-shaped backing plate 10 and a cup-shaped diaphragm 12. The annular side wall 14 of diaphragm 12 extends flush with the periphery of backing plate 10, and a relatively thick, rigid plate 16 is welded or otherwise fixed to the side wall behind and spaced from the flexible forward portion 18 of the diaphragm. Screws 20 hold the diaphragm 12 securely attached to the backing plate 10. In the particular embodiment shown, the plate 16 is piloted on a central embossment 22 formed integrally with and extending forwardly from the backing plate 10.

The assembled backing plate 10 and diaphragm 12 are mounted on the forward end of a machine tool spindle 24 or the like by screws 26 which are inserted into the diaphragm assembly through holes 28 in the flexible wall portion 18. In this connection it will be observed that the backing plate 10 is formed with a central, rearwardly extending embossment 30 which projects into and snugly fits a recess 32 provided centrally in the end face of the spindle 24.

A plurality of clamping jaws 34 are mounted on the flexible portion 18 of the diaphragm and the jaws preferably are arranged in annular series around the axis of the chuck. In practice, the jaws are opened to receive a workpiece, designated generally at 36, by flexing the diaphragm 18 forwardly or outwardly. When the diaphragm is released it closes the jaws 34 on the workpiece 36 so that the jaws hold the workpiece solidly for a machining or other operation. A counterweight 38 is provided on the rear face of the flexible diaphragm portion 18 behind each jaw 34 to offset any tendency of the jaw assembly to open as a result of centrifugal forces developed during operation of the chuck.

The power booster of this invention comprises relatively movable driving and driven elements, a body of elastomeric material arranged for mutual engagement with the two elements, and means confining the elastomeric material so that it is not free to expand without effecting movement of at least one element. Preferably the area of the driving element engaging the elastomeric body is smaller than the area of the driven element engaging the body so that substantially greater pressure is exerted by the driven element than is exerted by the driving element.

In the particular embodiment of the invention here under consideration the machine tool carrying the chuck is equipped with an actuator rod 40 which extends axially through a central bore 42 provided in the spindle 24. In order to adapt the power booster to this type actuator, the embossment 22 is formed with a recess 44. The recess opens through the forward face of the embossment 22 and the actuator rod 40 is provided with a piston like, forward extension 46 which projects through and is snugly but slidably received by an opening 48 provided in the backing plate 10. The extension 46 terminates flush with the bottom of the recess 44 when the rod 40 is retracted as shown in the drawings. A pusher member 50 interposed between the backing plate 10 and the flexible diaphragm portion 18 has a pistonlike head 52 on the rearward end thereof which fits snugly but slidably in the recess 44. The forward end of the pusher member 50 abuts against the flexible diaphragm portion 18. An elastomeric body 54 of rubber or the like is disposed within and entirely fills the portion of recess 44 behind the pusher member 50. It wil be observed in this connection that both the actuator rod 40 and the pusher member 50 engage the elastomeric body 54 and that the area of the actuator head 46 which contacts the body 54 is substantially smaller than the area of the pusher head 52 which contacts the elastomeric material.

In use, the rod 40 is pushed forwardly against the elastomeric body 54 in order to open the jaw assembly for release of the workpiece 36. As the rod 40 advances against the body 54 it exerts pressure against the body, and this pressure is transmitted to the entire surface of the pusher member 50. It will be observed in this connection body. Since the engaging area of the pusher member 50 is greater than the engaging area of the actuator 40, the force exerted by the rod 40 is multiplied according to the difference in the engaging areas of the two parts. For example, if the engaging area of the pusher member 50 is three times as large as the engaging area of the actuator rod 40 and a force of one thousand pounds is exerted against the body 54 by the actuator rod, the pusher member 50 exerts a force of three thousand pounds against the diaphragm 18.

From the above it will be apparent that the elastomeric body 54 acts in the same manner as hydraulic liquid to transmit pressure from the drive member 40 to the driven member 50, but it is not subject to many disadvantages inherent in the use of a hydraulic liquid. For example, it is not necessary to seal joints communicating with the chamber between the drive and driven elements as in the case of a hydraulic liquid and there is no possibility of losing the force-transmitting media as in the case of a hydraulic system. In fact, one of the main difficulties with using hydraulic means to amplify the force exerted by the actuator rod 40 in apparatus of this kind is the high incidence of loss of the hydraulic liquid. Almost invariably when a hydraulic system is subjected to high pressures, some loss of hydraulic liquid occurs and this liquid must be replaced from time to time in order to maintain operation of the apparatus. In many instances, as in the instant case, it is not convenient to replace this liquid without dismantling parts of the assembly, and this entails substantial labor costs as well as loss of production. All of these difficulties are obviated by the instant arrangement. In addition, a number of positive advantages are obtained by the instant construction. Fewer parts are required to perform the intended function, and the fewer parts embodying the instant invention accomplish the function in a superior manner. In addition, the device of this invention is considerably less expensive to manufacture than a hydraulically operated unit.

Attention is now directed to the form of the invention shown in Fig. 3 which is substantially identical to the form first described except that the chuck is adapted for pneumatic operation. It is believed that the construction will be clearly understood if corresponding numerals are employed to designate corresponding parts in the two forms of the invention and if only the structural parts are features which distinguish the two forms are described in detail.

In order to convert the form of the invention first described for pneumatic operation an annular ring 100 is inserted between the backing plate 10 and the diaphragm 12. This ring is fastened to the diaphragm by the screws 20, and the screws 26 are relatively longer than in the first form of the invention to accommodate the ring 100. It will be observed that the ring 100 defines a cylinder 102 between the backing plate 10 and the diaphragm 12, and a piston 104 is mounted to reciprocate back and forth in the cylinder. A suitable seal such as an O-ring 106 or the like retained in a peripheral groove 108 provided in the piston prevents leakage of pressure past the piston.

An adapter 110 is received within the recess 44 and is held securely attached to the backing plate 10 by screws 112. As clearly shown in the drawings, the adapter 110 extends forwardly of the backing plate and slidably journals the piston 104. The forward face of the piston in turn is formed with a recess 114 and the main body of the adapter 110 terminates flush with the bottom of the recess. In this connection it will be observed that the adapter 110 is provided with a centrally disposed forward extension 116 of reduced diameter and that a pusher member 118 modified to fit slidably over the extension 116 is provided between the piston 104 and the flexible portion 18 of the diaphragm 12. As in the form of the invention first described, a body 120 of elastomeric materials such as rubber or the like is disposed within the recess 114 behind the pusher member 118 and the body 120 entirely fills the space behind the pusher. In the form of the invention shown, a spacer 122 is attached to the forward end of the extension 116 by a screw 124, and the spacer provides a stop for the workpiece 36 as shown in the drawings. Air under pressure is introduced into the cylinder 102 behind piston 104 through a tube 126 which extends through the axial bore 42 of the spindle 24. The tube 126 has a threaded terminal 128 which is screwed into a hole 130 provided centrally in the backing plate 10 and the hole 130 communicates with a passage 132 which leads to the cylinder 102 behind the piston.

In operation, air under pressure is introduced into the cylinder 102 behind piston 104 and this air moves the piston forwardly in the cylinder. As the piston 104 advances, that portion of the annular bottom wall of recess 114 formed by the piston presses against the elastomeric body 120, and the force thus exerted against the body 120 is transmitted to the pusher member 118 which in turn reacts against the flexible diaphragm 18. In this connection it will be observed that the annular bottom wall of the piston recess 114 which engages the elastomeric body 120 is substantially smaller than the engaging surface area of the pusher member 118 so that the force exerted by the piston is substantially increased. Also, it will be readily apparent that the force against the piston is greater due to the relatively large total area of the piston 104. Of course, the actual pressures developed in any particular instance vary, depending upon the relative sizes of the parts involved. In one particular installation, however, air introduced into the cylinder 102 at seventy pounds per square inch created 1598 lbs. of pressure on the rear of piston 104, and the piston in turn acted on the elastomeric body 120 with a total of 704 lbs. per square inch. Under these circumstances, a force of 704 lbs. per square inch was also exerted on the rear face of the pusher member 118, and the latter exerted a total force on the diaphragm 18 of 3386 lbs.

From the above, it will be readily apparent that the power booster of this invention can be readily adapted to diaphragm chucks which are pneumatically operated, and at the same time all of the advantages described for the first form of the invention are retained.

Attention is now directed to Fig. 4 which shows still another modified form of the invention. This form also is generally similar to the form first described, but is adapted to a condition where the driving force is applied by a pulling motion instead of by a pushing motion. For convenience, and in the interest of brevity, corresponding parts of the two forms are identified by the same reference numerals, and only the specifically different parts or features are described in detail.

The form shown in Fig. 4 differs from the first form of the invention in that the recess 44 is extended entirely through the backing plate 10 and into the spindle 24. A suitable spacer 200 is provided in the bottom of the recess 44 and an annular disk 202 of elastomeric material is provided on the forward face of the spacer. A pull rod 204 disposed in the axial bore 42 extends centrally through the spacer 200 and elastomeric body 202, and an actuator 206 fastened on the terminal portion of the rod by a nut 208 has a rearwardly facing radial shoulder 210 which seats rearwardly against the inner marginal portion of the body 202. An annular spacer 212 interposed between the elastomeric body 202 and the pusher member 50 fits snugly but slidably within the recess 44 and around the actuator 206. Thus, in this form of the invention the actuator 206 seats rearwardly against the inner marginal portion of the elastomeric body 202 and the annular spacer 212 forming a slidable cylinder around the actuator seats against the entire portion of the body which projects radially outwardly beyond the actuator.

In operation, the rod 204 is pulled rearwardly to force the radial shoulder 210 against the elastomeric body 202. The force thus exerted tends to compress the body 202 and stresses thus created in the body are exerted against the engaging rearward face of the spacer 212. Force thus exerted against the spacer forces the latter forwardly against the pusher member 50 which in turn acts against the flexible diaphragm portion 18. It will be readily apparent in this connection that force exerted by the actuator 206 against the spacer 212 through the elastomeric body 202 will be increased if the total area of the body contacted by the annular spacer 212 is greater than the total area of the body contacted by the actuator 206. For example, a 1,000-lb. pull exerted on the rod 204 will be translated to a 2,000-lb. push against the diaphragm if the area of the body 202 engaged by the spacer 212 is twice as large as the area of the body engaged by the actuator 206.

Manifestly, the device operates in the same manner as the form of the invention first described to actuate the clamping jaws 34 and it will be readily apparent that all of the advantages described in connection with the first form of the invention also are inherent in the latter construction.

Having thus described the invention, we claim:

1. A diaphragm chuck comprising a backing plate, a cup-shaped diaphragm fastened peripherally to said plate, a plurality of clamping jaws arranged substantially centrally in annular series on said diaphragm, means forming a central chamber behind said diaphragm and said chamber having an annular wall defining an opening to said chamber, an elastomeric material in the bottom of said chamber, a pusher member behind and bearing against said diaphragm slidably supported by the annular wall of said chamber and operative to flex the diaphragm so as to operate said clamping jaws, a tubular member interposed between said elastomeric material and said pusher member and slidably supported by the annular wall of said chamber, one end of said tubular member bearing against said pusher member, the other end of said tubular member bearing against said elastomeric material, and an actuator in and slidably supported by said tubular member having a radial surface bearing against said elastomeric material, said actuator and said tubular member jointly co-operting to confine said elastomeric material in the chamber, and said actuator adapted to transmit pressure through said elastomeric material through said tubular member and thence to said pusher member whereby to force the latter against the diaphragm.

2. A diaphragm chuck comprising a backing plate, a diaphragm fastened to and spaced from said plate, a plurality of clamping jaws arranged in annular series on said diaphragm, means forming a chamber behind the diaphragm, an elastomeric material in said chamber, a pusher member interposed between said elastomeric material and said diaphragm operative to flex the diaphragm so as to operate said clamping jaws, a slidably actuable annular spacer interposed between the pusher member and the elastomeric material seating endwise against the latter, and an actuator fitting snugly within and movable relative to the spacer also seating against said elastomeric material, said actuator and said spacer jointly co-operating with the walls of said chamber to confine said elastomeric material, said actuator adapted to transmit pressure through said elastomeric material to said spacer and thence to said pusher member whereby to force the latter against said diaphragm.

3. A diaphragm chuck comprising a flexible diaphragm, a plurality of clamping jaws on said diaphragm, support means carrying said diaphragm, means forming an entirely closed cavity behind said diaphragm, an elastomeric material entirely filling said cavity, said cavity forming means including fixed stationary walls and a pair of movable walls, both of said movable walls being at one side of said cavity and in contact with said elastomeric material, one of said movable walls being in the form of a driving member and the other of said movable walls being in the form of a driven member, actuating means coactive with said driving member to force the same against said elastomeric material whereby to force said driven member in a direction away from such elastomeric material, and means for transmitting the mentioned movement of said driven member into flexure of said diaphragm so as to operate said clamping jaws.

4. The combination as set forth in claim 3 wherein the surface area of the driving member contacting said elastomeric material is less than the surface area of the driven member contacting said material so that movement of the driving element against said elastomeric material results in multiplication of forces.

5. A power booster comprising means forming a chamber, a body of elastomeric material in and completely filling one end of said chamber, a driving element extending axially into the chamber through said elastomeric material, said element having a radial shoulder seating against said elastomeric material and being spaced radially inwardly from the wall of the chamber, and an annular driven element slidably mounted in the chamber with said driving element, said driving and driven elements co-operating to confine the elastomeric material in said chamber so that pressure applied by said driving element against said elastomeric material is transmitted to said driven element, and whereby movement of said driving element in one direction necessarily results in a corresponding movement of said driven element in the opposite direction.

6. A power booster comprising means forming a chamber, a body of elastomeric material in and completely filling one end of the chamber, a driving element extending axially into the chamber through said elastomeric material, said element having a radial shoulder seating against said elastomeric material and being spaced radially inwardly from the wall of said chamber, and an annular driven element slidably mounted in the chamber with said driving element, said driving and driven elements co-operating to confine the elastomeric material in said cylinder, the surface area of the driving element contacting said elastomeric material being less than the surface area of the driven element contacting said material so that movement of the driving element in one direction against said elastomeric material results in multiplication of forces tending to move said driven element in the opposite direction.

7. A power booster comprising means forming an entirely closed cavity, and an elastomeric material entirely filling said cavity, said cavity forming means including fixed stationary walls and a pair of movable walls, both of said movable walls being at one side of said cavity and in contact with said elastomeric material, one of said movable walls being in the form of a driving member and the other of said movable walls being in the form of a driven member, whereby movement of said driving member in one direction against said elastomeric material acts through the latter to move said driven member in the opposite direction.

8. A power booster comprising means forming a closed cavity, and an elastomeric material entirely filling said cavity, said cavity forming means including at least one stationary part in contact with the elastomeric material and at least two slidably movable parts disposed on the same side of said elastomeric material, said movable parts contacting said elastomeric material, and the contacting area of one of said movable parts being larger than the contacting area of the other movable part, actuator means coactive with one of said movable parts to force it in one direction against said elastomeric material whereby to move the other of said movable parts in the opposite direction.

9. A power booster comprising means forming a closed cavity, and an elastomeric material entirely filling said cavity, said cavity forming means including at least one stationary part in contact with the elastomeric material and at least two movable parts disposed on the same side of said elastomeric material, said movable parts contacting said elastomeric material and the contacting area of one of said movable parts being larger than the contacting area of the other movable part, and actuating means coactive with said other movable part having the smaller contacting area operative to slidably actuate said other movable part forcibly against said elastomeric material whereby to multiply the forces acting through said material and to effect a reverse actuation of said one part.

10. A power booster comprising means forming an entirely closed cavity, an elastomeric material entirely filling said cavity, said cavity forming means including fixed stationary walls and a pair of movable walls, both of said movable walls being at one side of said cavity and in contact with said elastomeric material, one of said movable walls being in the form of a driving member and the other of said movable walls being in the form of a driven member, said driving member extending through said elastomeric material and being slidably supported by said stationary walls, and means connected to said driving member operative to force the same against said elastomeric material whereby to effect a reverse actuation of said driven member.

References Cited in the file of this patent

UNITED STATES PATENTS

| | | |
|---|---|---|
| 2,368,181 | Vernet | Jan. 30, 1945 |
| 2,450,800 | Hohwart et al. | Oct. 5, 1948 |
| 2,464,507 | Hohwart et al. | Mar. 15, 1949 |
| 2,553,990 | Vidal | May 22, 1951 |
| 2,570,854 | Pierce | Oct. 9, 1951 |

FOREIGN PATENTS

| | | |
|---|---|---|
| 303,201 | Great Britain | Dec. 31, 1928 |